Jan. 6, 1931     O. WISNER     1,788,223
SPRAYER
Filed Sept. 26, 1927
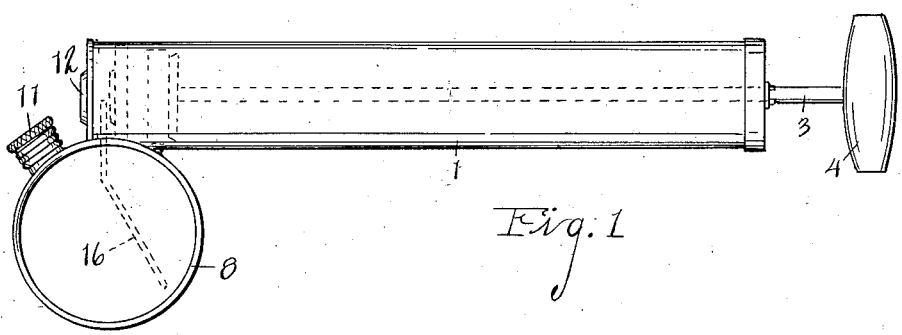
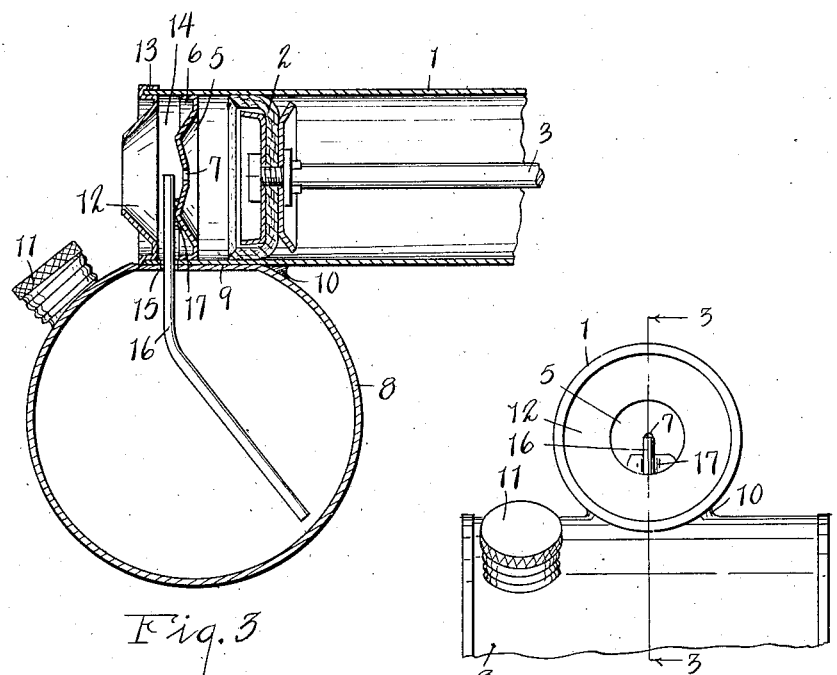
INVENTOR
Otto Wisner
BY Chappell & Earl
ATTORNEYS Patented Jan. 6, 1931

1,788,223

UNITED STATES PATENT OFFICE

OTTO WISNER, OF LOWELL, MICHIGAN, ASSIGNOR TO LOWELL SPECIALTY COMPANY, OF LOWELL, MICHIGAN

SPRAYER

Application filed September 26, 1927. Serial No. 222,061.

The main objects of this invention are:

First, to provide an improved atomizer or sprayer well adapted for such liquids as fly or insect destroying solutions and adapted to prevent the dripping of such solutions from the sprayer while or after operating.

Second, to provide a sprayer having these advantages which permits the sprayer being rotated or swung about without danger of the drip being spilled from the drip cup or drip chamber.

Third, to provide a sprayer or atomizer which is highly efficient and attractive in appearance.

Objects pertaining to details and economies of my invention will appear from the description to follow. The invention is defined in the claims.

A structure embodying the features of my invention is clearly illustrated in the accompanying drawing, in which:

Fig. 1 is a side elevation of my improved sprayer.

Fig. 2 is a front end elevation with the liquid receptacle partially broken away.

Fig. 3 is a detail vertical section on a line corresponding to line 3—3 of Fig. 2, parts being shown in full lines for convenience in illustration.

Referring to the drawing, 1 represents the barrel or cylinder of the air pump, 2 the piston, 3 the piston rod and 4 the handle thereof. The cylinder or barrel 1 is provided with a head 5 which is arranged in spaced relation to the front end of the cylinder, this head having a flange 6 fitting within and secured to the wall of the cylinder. The head has a central air discharge orifice 7.

The receptacle 8 is in the embodiment illustrated cylindrical and disposed in transverse relation to the cylinder. The receptacle has a seat 9 formed on its under side to receive the cylinder, the cylinder and receptacle being secured together in practice by solder indicated at 10. The receptacle is provided with a filling cap 11.

An outer or drip cup wall 12, preferably conical as illustrated, is secured to the end of the cylinder, preferably by seaming at 13 as in the structure illustrated. This wall coacts with the head 6 and the wall of the cylinder to provide an annular drip chamber or cup 14.

Registering openings 15 are formed in the walls of the tank and receptacle to provide a drain connection for the drip cup to the receptacle and also to receive the atomizing tube 16 which depends into the receptacle and is secured to the head with its outer end in operative relation to the air discharge opening 7. The securing means illustrated is at 17.

The conical outer wall of the drip chamber serves to gather or collect the heavier particles—the particles of the liquid that are not properly atomized—directing the same back into the drip cup from which they return to the receptacle. However, should considerable drip collect in the drip cup it does not escape, even though the sprayer be laid down on its side or placed in an inverted position, or when it is oscillated or swung about in use. Whatever liquid may be collected in the drip cup is effectively retained therein, both in operation of the device and, as stated, when it is laid down, even though it be placed otherwise than in the upright position shown in the drawing.

The structure is simple and economical to produce and is very neat and attractive in appearance. I have illustrated and described my improvements in an embodiment which I have found very practical. I have not attempted to illustrate and describe various adaptations or modifications in the form of the pump or liquid receptacle which are possible as I believe the disclosure made will enable those skilled in the art to embody or adapt my improvements as may be desired.

Having thus described my invention what I claim as new and desire to secure by Letters Patent is:

1. In a sprayer, the combination of an air pump comprising a cylinder provided with a head spaced from its end and having a central discharge opening therein, a liquid receptacle secured on the under side of said cylinder, an outwardly projecting conical outer wall seamed upon the end of said cylinder and coacting with said head and the wall of the cylinder to provide an annular drip cup, said cylinder wall and receptacle having registering openings connecting the drip cup with the receptacle, and an atomizing tube arranged through said openings and depending into said receptacle, said tube being secured to said head with its outer end in operative relation to said air discharge orifice and centrally of said drip cup.

2. In a sprayer, the combination with an air pump comprising a cylinder having a head provided with an air discharge orifice, said head being disposed in spaced relation to the end of the cylinder, an outer wall member secured to said cylinder and having an opening alined with said air discharge orifice of said cylinder and coacting with said head and the cylinder wall to provide a drip cup within the cylinder, a receptacle on said cylinder, and an atomizing tube disposed through the side wall of the cylinder to depend into said receptacle with its upper end between said head and said outer wall member and in operative relation to said air discharge orifice.

3. In a sprayer, the combination of an air pump comprising a cylinder having a head spaced from the end of the cylinder and provided with a central air discharge orifice, a receptacle mounted on said cylinder, an outer wall having a central opening secured to the cylinder in spaced relation to said head and coacting therewith to provide an annular drip chamber, and an atomizing tube arranged with its outer end centrally of said drip chamber and in operative relation to said air discharge orifice, there being a drain connection for said drip chamber to said receptacle.

4. In a sprayer, the combination of an air pump comprising a cylinder provided with a head spaced from its end and having an air discharge opening, a liquid receptacle secured on the under side of said cylinder, an annular drip cup wall secured to said cylinder, and coacting with said head and the wall of the cylinder to provide an annular drip cup, said cylinder and receptacle walls having openings connecting the drip cup with the receptacle, and an atomizing tube depending into said receptacle with its outer end in operative relation to said air discharge orifice.

5. In a sprayer, the combination of an air pump comprising a cylinder adapted as a hand piece for the manipulation of the sprayer and having a head spaced from its end and provided with an air discharge orifice, a drip cup wall mounted within said cylinder in spaced relation to said cylinder head and coacting therewith and with the cylinder walls to provide a drip cup within the cylinder, a liquid receptacle mounted on said cylinder, there being a drain connection from said drip cup to said receptacle, and an atomizing tube depending into said liquid receptacle and arranged with its outer end within said drip cup and in operative relation to said air discharge orifice.

6. In a sprayer, the combination of an air pump comprising a cylinder adapted as a hand piece for manipulating the sprayer and having a head spaced from the end of said cylinder and provided with a central air discharge orifice, a conical annular drip cup wall having an annular peripheral seam flange engaging the end of the cylinder, a liquid receptacle mounted on said pump cylinder, there being a drain connection for said drip cup to said receptacle, and an atomizing tube depending into said receptacle and arranged with its upper end between said head and drip cup wall and in operative relation to said air discharge orifices.

7. In a sprayer, the combination of an air pump comprising a cylinder adapted as a hand piece for the manipulation of the operator and having a head spaced from its end and provided with an air discharge orifice, a drip cup wall disposed within the cylinder in spaced relation to the cylinder head and coacting therewith and with the cylinder wall to provide a drip cup within the cylinder, a liquid receptacle mounted on said cylinder, there being a drain connection for the drip cup to the receptacle, and an atomizing tube disposed through the side wall of the cylinder with its outer end between said drip cup wall and cylinder head and in operative relation to said air discharge orifice with its lower end depending into said receptacle.

8. In a sprayer, the combination of an air pump comprising a cylinder adapted as a hand piece for the manipulation of the sprayer and having a head spaced from its end and provided with an air discharge orifice, a drip cup wall secured to said cylinder in spaced relation to said cylinder head and coacting therewith and with the cylinder wall to provide a drip cup within the cylinder, a liquid receptacle secured to said cylinder, there being a drain connection from said drip cup to said receptacle, and a liquid discharge tube depending into said liquid receptacle and arranged with its outer end within said drip cup and in operative relation to said air discharge orifice.

9. In a sprayer, the combination of an air pump comprising a cylinder adapted as a hand piece for the manipulation of the operator and having a head spaced from its end and provided with an air discharge orifice, a drip cup wall disposed at the end of the cylinder in spaced relation to the cylinder head and coacting therewith and with the cylinder wall to provide a drip cup within the cylinder, a liquid receptacle secured to said cylinder, there being a drain connection for the drip cup to the receptacle, and a liquid discharge tube disposed through the side wall of the cylinder with its outer end between said drip cup wall and cylinder head and in operative relation to said air discharge orifice with its lower end depending into said receptacle.

10. A tank and a pump cylinder secured together, said cylinder having an end wall arranged to provide a drip-catch chamber between the end wall and the open end of the cylinder, said end wall having a discharge orifice, a drain passage being provided to establish communication between the chamber and the tank.

11. A tank and a pump cylinder secured together, said cylinder having an end wall, having at least that portion nearest the tank spaced inwardly from the end of the cylinder to provide a drip catch chamber within the cylinder between the spray end wall and the open end of the cylinder, said end wall having a discharge orifice, a drain passage being provided to establish communication between the chamber and the tank, and the arrangement being such that residual liquid dripping at the outer side of the end wall is trapped in the catch-chamber, and the arrangement further being such that when the tank engages a support and when that end of the cylinder remote from the tank also engages the support, the cylinder is angularly disposed so that drippings flow by gravity toward the drain passage.

In witness whereof I have hereunto set my hand.

OTTO WISNER.